Patented Dec. 16, 1930

1,785,270

UNITED STATES PATENT OFFICE

FRANCOIS LAVIROTTE, OF LYON, FRANCE, ASSIGNOR TO STANDARD OIL DEVELOPMENT COMPANY, A CORPORATION OF DELAWARE

PROCESS OF PREPARING PETROLATUM AND THE LIKE AND PRODUCT OBTAINED THEREBY

No Drawing. Application filed September 30, 1925, Serial No. 59,518, and in France October 4,, 1924.

This invention relates to improvements in the preparation of purified hydrocarbon products, especially petrolatum, petrolatum oil, and the like.

In accordance with the present invention, hydrocarbon material containing substantial amounts of petrolatum and/or petrolatum oil and capable of serving as a source of the desired products is treated with strong sulfuric acid at an elevated temperature. Sulfuric acid containing free sulfuric anhydrid, such as oleum or fuming acid, is preferred. However, by increasing the time of the reaction or the temperature at which it is conducted, or both, somewhat less concentrated acid may be successfully used.

The hydrocarbon material treated may be crude petrolatum, petrolatum grease, certain lubricants of the type known as black oils, dark machinery oil, or the like, or mixtures thereof. Numerous petroleum distillation residues, even though of low grade, may be used successfully in my improved process.

The reaction is advantageously conducted in the presence of a relatively inert hydrocarbon material that is liquid under the operating conditions. Such inert menstruum may be the product obtained by the present process, although other hydrocarbons not readily susceptible to attack by strong sulfuric acid may be used.

The following example shows the procedure to be followed when a relatively inert menstruum is used: Equal parts by weight of a black oil and of a relatively inert hydrocarbon material, preferably unfiltered petrolatum from a preceding operation, are mixed at a temperature above the melting point of the petrolatum and are treated with about 1.5 parts by weight of 20% oleum. The oleum is added slowly with continuous stirring so as to prevent sudden rise in temperature. In general it is necessary to take care that the temperature does not rise above 170° C. in any portion of the reacting mass. Heat is suitably applied to maintain a temperature of about 120° to 160° C. Stirring should be continued at least until carbonaceous or coke-like bodies begin to form, and may be continued longer if it is desired to prevent the formation of a coherent carbonaceous mass.

The petrolatum from a preceding operation, having already had substantially all its acid-reactive components removed, remains as a liquid. In this way overheating of the lower portion of the reaction mass may be readily avoided. When heating with a free flame and in the absence of an inert oil menstruum, the vessel may become filled with carbon and excessive heating is likely to occur with destruction of some of the valuable product. These difficulties may be avoided, however, by using oil baths, steam jackets, or the like, for heating the reaction vessel. An additional important advantage of the inert menstruum is that it permits good contact of the acid with the oil.

The time of heating may be varied considerably. Ordinarily, 24 hours is sufficient when working with 20% oleum at the temperature stated and in the presence of an inert oil. Sulfur dioxid is evolved during the course of the reaction and when this gas is no longer given off in substantial amount the reaction may be considered complete.

The liquid product is then drawn off. It consists of white petrolatum containing carbonaceous particles and usually a small amount of residual acid. The liquid is suitably purified as by neutralization and filtration. A suitable method of neutralization is agitation of the petrolatum with about 10% by weight of filter clay and 1.5% by weight of a neutralizing agent, such as calcium carbonate. In some cases the agitation must be continued for from 3 to 4 hours at a temperature of about 120° C. to secure complete neutralization. In other cases neutralization is more readily effected. The petrolatum is preferably filtered through clay while it still retains the heat imparted to it during the reaction. The filter should be suitably heated, as by a steam jacket or the like, to facilitate the flow of the petrolatum.

The carbonaceous mass contains a substantial amount of petrolatum, which is recovered in the following manner: The mass remaining in the reaction vessel is broken up, if in coherent form, and transferred to an extraction apparatus. It is there treated with a suitable solvent, such as naphtha, benzol, or the like, which dissolves the petrolatum retained by the mass of solid or semi-solid carbonaceous bodies. The resulting solution is drawn off and distilled to remove the solvent. The petrolatum from which the solvent has been removed is neutralized and filtered, if necessary. Other suitable methods of separating the petrolatum from the solvent, such as chilling and settling, may be adopted.

A preferred procedure when no inert oil menstruum is used is as follows: In the first stage of the operation crude petrolatum or other suitable hydrocarbon is heated to somewhat above its melting point in a vessel equipped with a stirrer. When the petrolatum is melted the heating is discontinued, the stirrer is put in operation, and sulfuric acid containing about 20% of sulfuric anhydrid is fed in at such a rate that the temperature of the mixture is maintained below about 100° C. and preferably at about 70° C. The weight of acid should be about 1.5 times the weight of crude petrolatum. It is best to add the acid slowly, for example throughout a period of about 24 hours, and during this period the temperature of the mixture is to be kept at about 60–70° C. The resulting product is a uniform fluid mixture containing reddish brown sulfonated compounds. If the reaction has been properly conducted, no free carbon will appear in the mixture.

The second stage of the operation involves the heating of the mixture to about 160°–170° C. to carbonize the sulfonated compounds. A more or less coherent carbonaceous mass is ordinarily formed as a bottom layer in the reaction vessel, the liquid product forming an upper layer. This stage of the reaction may last for about 48 hours. When the reaction is completed the mixture is allowed to cool to about 100° C. and the liquid product, which normally contains sulfonated compounds that have escaped carbonization, is withdrawn. It is possible to complete the carbonization in a single stage, but to do this a higher temperature (generally around 200° C.) is required. This is not desirable on account of the difficulty of controlling the reaction and the danger of the mixture catching fire. The carbon is extracted as before.

The residual sulfonated compounds may be removed by a second acid reaction. The impure petrolatum together with that extracted from the carbonaceous mass (preferably in the manner previously described) is melted if necessary and stirred with oleum of about 20% strength in the proportion of about 30–40 parts by weight of oleum to 100 parts of petrolatum. The addition of the acid may be regulated as in the first stage described above. When the acid has all been added, the stirring is discontinued and the temperature is increased to not more than about 150°–160° C. The sulfonated compounds are carbonized under these conditions and the color of the petrolatum becomes a light yellow. This operation may require about 36 hours. The amount of carbon formed in this stage is ordinarily small. It may be extracted for the recovery of retained petrolatum, as previously described. The treated petrolatum is allowed to cool and the liquid is withdrawn and filtered to remove carbon particles.

Instead of giving the partly purified petrolatum a second acid treat, the residual sulfonated compounds and any other impurities may be separated by extracting the mixture with a solvent that will dissolve the petrolatum only. For this purpose a light naphtha, for example having an end boiling point below 90° C., may be used to good advantage. Alcohols and other solvents, however, are available for this purpose.

I prefer to conduct the processes with the slow addition of acid and extended time of reaction, as described. Nevertheless, it is possible to expedite them considerably without much sacrifice of efficiency.

The liquid product, after the second acid treat or the extraction, may be filtered through clay, preferably finely comminuted and heated. The filter may be filled about two-thirds full of a clay, the temperature of the mass being maintained by circulation of steam through a jacket about the filter, or in other suitable ways. The petrolatum product is then passed into and through the filter, which may be operated under any suitable conditions. The filtered product is ordinarily pure white until a weight of petrolatum about equal to the weight of clay is passed through the filter. The product may thereafter have a slightly greenish tinge which becomes progressively darker as the clay approaches exhaustion.

As soon as filtration ceases to be efficient, the clay, retaining petrolatum in amount about one-third of the weight of the clay, is allowed to cool to about 50° C. and is extracted with a suitable solvent for the petrolatum, such as naphtha. The petrolatum is recovered from the solvent by distilling off the latter, provision being made for its condensation. The clay may be revivified in the well-known manner.

The sulfur dioxid evolved during the acid treatments may be withdrawn by an exhauster and passed into a solution of an alkali for the formation of bisulfite, or it may be otherwise recovered. A sodium carbonate solution of about 28% strength is advantageous for absorbing the sulfur dioxid.

The carbonaceous material from which the petrolatum has been extracted is heated, preferably in a revolving furnace, to about 400°

C. for a sufficient time to drive off substantially all matter volatile at that temperature. Sulfur dioxid is evolved during this heating and may be recovered as stated above. The carbonaceous material is removed from the furnace and ground in a ball mill or the like. The grinding is best continued until an almost impalpable powder is produced. The powder is then heated in a suitable furnace to a red heat while being slowly agitated in contact with air. Partial combustion takes place, usually about one-half the carbon being consumed in the production of a material of the desired activity. The extent of combustion may be regulated by the amount of surface exposed by the stirring. In this way the carbon is made very porous and adsorptive. The activation of the carbon is considered to be finished when a sample, shaken vigorously with water, is completely wetted and distributes itself throughout the water.

The processes of the present invention result in petrolatum products of a high degree of purity. These products are characterized by the substantial absence of coloration, taste, and odor. They are unaffected by exposure to air or light, even for long periods, and are not reacted upon by acids or alkalis under normal conditions. As compared with prior petrolatums of commerce, an important distinctive feature of my new product is substantial freedom from discoloration when treated with sulfuric acid of about 95–98% strength at temperatures up to 25° C., or even higher, or with 63–65% sulfuric acid at temperatures up to 100° C. A particularly valuable feature of my invention is the production, especially from inferior materials, of a snow-white petrolatum which is non-deteriorating on standing.

Various alternative procedures may be adopted within the scope of the appended claims, in which it is my intention to claim all novelty inherent in the invention, as broadly as the prior art permits.

I claim:

1. Process of preparing pure petrolatum, which comprises treating a material of the type of crude petrolatum with strong sulfuric acid at an elevated temperature below 100° C. for an extended period, whereby bodies in the crude petrolatum which react with acid are converted into sulfonated compounds, materially increasing the temperature of the mixture but not to exceed 200° C. and maintaining such temperature until the sulfonated compounds are largely carbonized, and separating the liquid from the carbonized bodies.

2. Process of preparing pure petrolatum, which comprises treating at about 70° C. a material of the type of crude petrolatum with oleum, whereby bodies in the petrolatum which react with acid are converted into sulfonated compounds, increasing the temperature of the mixture to about 160°–170° C. and maintaining such temperature for an extended period to carbonize the sulfonated bodies in large part, separating the liquid from the carbonized bodies, and treating the liquid for the removal of sulfonated compounds that escaped carbonization.

3. The invention according to claim 2, in which the residual sulfonated compounds are carbonized by treatment with oleum at an elevated temperature for an extended period and the purified liquid is filtered to separate the carbonized bodies so formed.

4. Process of preparing substantially pure and stable white petrolatum, which comprises treating crude petrolatum with strong sulfuric acid at a temperature of about 70° C. for about 24 hours, whereby undesirable constituents of the crude petrolatum are converted into sulfonated compounds, increasing the temperature to about 160°–170° C. for about 48 hours to carbonize the sulfonated compounds, withdrawing the liquid product and subjecting it to a second acid treatment whereby residual sulfonated compounds are carbonized, separating carbonaceous bodies from the liquid, and filtering the liquid through finely divided clay.

5. Petrolatum characterized by substantial freedom from discoloration when treated with sulfuric acid of about 95–98% concentration at temperatures about 25° C.

6. Petrolatum characterized by the substantial absence of coloration, taste and odor, by stability under long exposure to air and light, and by substantial freedom from discoloration when treated with sulfuric acid of about 95–98% concentration at temperatures about 25° C.

7. In a process of preparing petrolatum of substantial purity, the improvement which comprises reacting at an elevated temperature with fuming sulfuric acid upon a material containing petrolatum associated with carbonizable substances, continuing the acid treatment until the said substances are converted into non-liquid carbonaceous bodies, and separating the residual petrolatum.

8. Process of preparing pure petrolatum, comprising treating a crude hydrocarbon material containing the same with strong sulfuric acid in amount in excess of the weight of the oil and at an elevated temperature, continuing the treating until substantially all undesirable constituents in said material are converted into non-liquid, undissolved, carbonaceous bodies, and separating the liquid product containing only substantially pure colorless and stable hydrocarbons.

9. The process according to claim 8, in which the liquid product is neutralized to remove any residual acid and suspended particles are removed by filtration.

10. Process of purifying crude petrolatum, which comprises converting substantially all undesirable constituents thereof into solid carbonaceous bodies by treatment with strong sulfuric acid in large amount and at an elevated temperature, dissolving purified hydrocarbon material from the carbonaceous bodies so formed, and separating the purified hydrocarbons from the solvent.

11. Process of purifying crude petrolatum, which comprises converting undesirable constituents thereof into solid carbonaceous bodies by treating with strong sulfuric acid in large amount and at an elevated temperature, drawing off liquid product containing only substantially pure and stable hydrocarbons, dissolving from the carbonaceous bodies any liquid product retained thereby, withdrawing the solution, and separating the petrolatum and the like therefrom.

12. Process according to claim 11, in which the crude material is dissolved in a relatively inert hydrocarbon material and reaction takes place in the resulting solution.

13. In the manufacture of petrolatum from a crude material containing the same, the improvement which comprises eliminating undesirable constituents from said material by reacting thereon with about 1.5 parts by weight of oleum at an elevated temperature, whereby said components are converted into non-liquid, undissolved, carbonaceous bodies, and separating said bodies from the remaining liquid consisting almost entirely of pure and stable petrolatum hydrocarbons.

FRANCOIS LAVIROTTE.